United States Patent [19]

Stone, Jr.

[11] 4,018,947
[45] Apr. 19, 1977

[54] METHOD FOR EDGE MARKING RECORDABLE WEBS

[76] Inventor: Wayne B. Stone, Jr., 7307 Nevis Road, Bethesda, Md. 20034

[22] Filed: Feb. 19, 1976

[21] Appl. No.: 659,565

Related U.S. Application Data

[63] Continuation of Ser. No. 405,904, Oct. 12, 1973, abandoned.

[52] U.S. Cl. ............................. 427/284; 352/236; 360/134
[51] Int. Cl.² ......................................... B05D 5/00
[58] Field of Search ................... 427/284; 352/236; 360/72, 134

[56] References Cited

UNITED STATES PATENTS

| | | | |
|---|---|---|---|
| 3,801,750 | 4/1974 | Beaumont | 360/134 |
| 3,810,246 | 5/1974 | Stone et al. | 360/134 |

*Primary Examiner*—Ronald H. Smith
*Assistant Examiner*—Sadie L. Childs

[57] ABSTRACT

The Disclosure is directed to a new method of edge marking recordable webs such as audio and/or video tape. A running tape length is initially established between supply and take-up reels. The running path length is intermittently displaced, parallel to the recording surface, which results in a plurality of spaced, concentric, arcuate wrap segments on the take-up reel whose side edges project beyond the side edges of the remainder of the wraps. The side edges of the projecting wrap segments are then marked in any desired manner such as by bringing the same into marking engagement with a printing or marking die whose approach to the wound take-up reel is limited to insure that the non-projecting wraps are not marked.

14 Claims, 9 Drawing Figures

FIG. 5
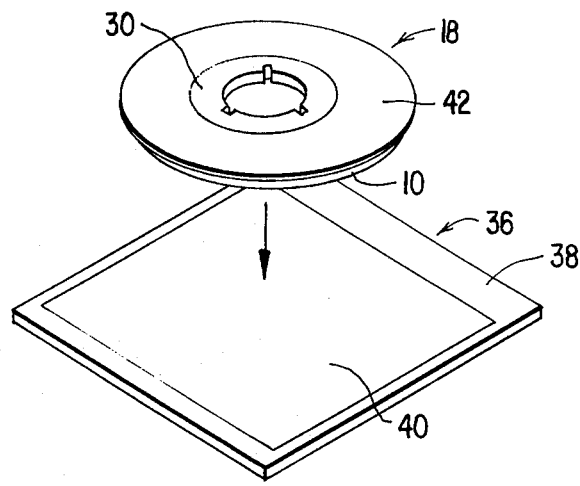
FIG. 7
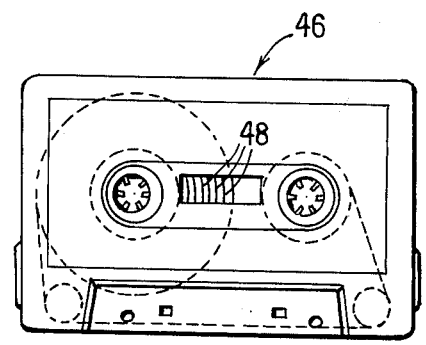
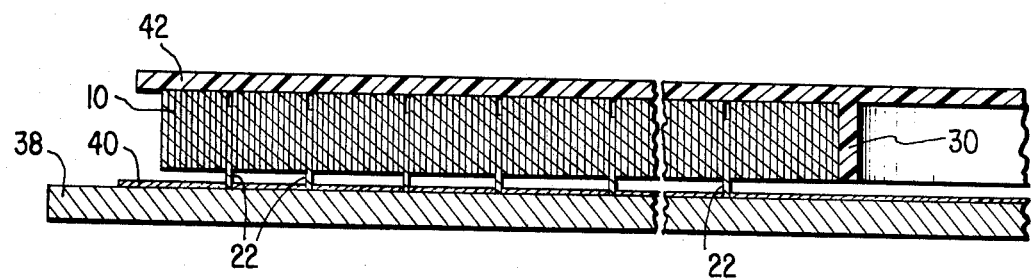
FIG. 6
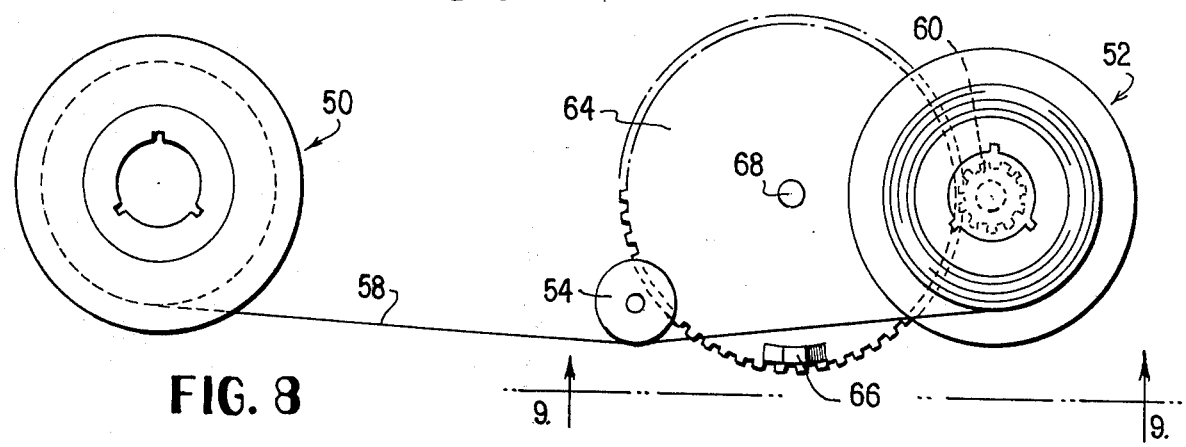
FIG. 8
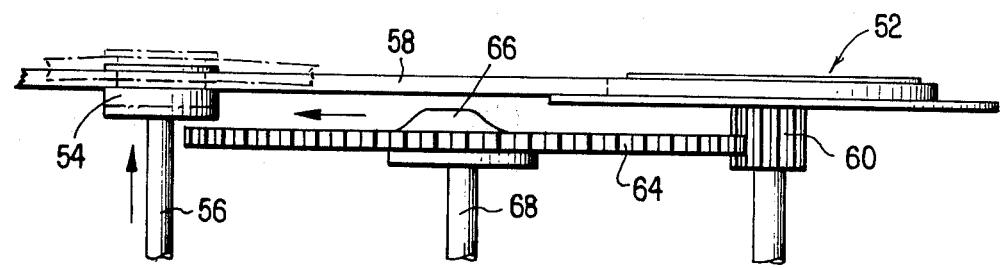
FIG. 9

METHOD FOR EDGE MARKING RECORDABLE WEBS

This application is a continuation of application Ser. No. 405,904, filed Oct. 12, 1973, now abandoned.

BACKGROUND OF THE INVENTION

The concept of applying cue indicia to one or both side edges of a recordable web such as magnetic tape to facilitate the location of audio pause intervals between recorded selections was introduced by commonly owned, copending application Ser. No. 199,475 filed Nov. 17, 1971now U.S. Pat. No. 3,810,246 and reference may be had thereto for a full statement of the advantages inhering from the use of edge marked tapes.

The method heretofore employed for edge marking tape is substantially the same as that disclosed in the aforesaid copending application and involves the intermittent movement of an inked marking roller into marking contact with the tape edge. The primary disadvantage in that method is a function of the ink drying time. Thus, following marking of the tape the ink must be dried before winding onto a take-up reel to avoid ink smear onto adjacent unmarked portions of the tape. This requires substantial transport of the tape prior to take-up as to permit of air drying, passage through a drying oven, etc. Such tape transport, in turn, requires specially designed idle pulleys to avoid ink smear onto the guide flange of a conventional idle pulley. An ancillary disadvantage is the precise adjustment that must be maintained between the inking roller and running tape edge. If the roller approaches too closely ink will be deposited on the record surface of the tape while a less than precise approach fails to mark the tape. In the latter event, because of the desired high speed transport onto a take-up reel, the failure to mark is not noticeable until after the tape is wound on the take-up reel which results in loss of the entire reel.

The supply and take-up reels previously referred to may, in the case of magnetic tape destined for use in cassettes, typically accommodate 6,000 feet of tape. In the case of prerecorded tapes, the blank tape is supplied by the manufacturer in the form of a "pancake" which may comprise the 6,000 foot supply reel. The supply reel is threaded onto a take-up reel for high speed transport therebetween across a record head in a so-called duplicating operation wherein a master tape recording is duplicated a plurality of times along the length of the tape as it is transported to the take-up reel. Following duplication, the take-up reel becomes the supply reel for a cassette loading machine of conventional design. When cassettes are to be loaded with non-recorded tape which is not edge marked, the original supply reel from the manufacturer becomes the supply reel for the cassette loading machine.

The primary object of the invention is to permit high speed marking of virtually any tape length in a manner rendering the practice of the invention insensitive to ink drying time and wherein the freshly applied ink does not come into contact with any moving parts. The foregoing is achieved by the simultaneous application of the required cue marks to a side edge of the magnetic tape while it is in the wound condition.

SUMMARY OF THE INVENTION

The conventional supply reel or pancake for a cassette loading machine is tightly wound with the opposite side edges of the wound tape presenting opposed flat surfaces on the wound reel of tape. Through the practice of the invention, radially spaced ones of the wound tape wraps, or wrap segments, are offset in a direction parallel to the broad recording surface of the tape whereby a side edge of each offset wrap or wrap segment projects just beyond the flat surface defined by the side edges of the remaining wraps. A marking or inking dye may then be contacted with the side edges of all the projecting wraps or wrap segments simultaneously to produce cue marks which are spaced along the length of the wound tape. The wound tape reel may then be set aside until the ink dries after which time it is used to supply a cassette loading machine in conventional manner. In the case of dual track tape, the opposite side edge of the wound reel may be marked in a similar manner prior to the cassette loading operation. The magnitude of the offset is maintained as small as consistent with good marking of the offset wrap edges while avoiding any inking contact with the remainder of the wraps. An exemplary offset producing the desired effect is one thirty second inch where the inking dye has a doctored ink depth of one sixty fourth inch. Similarly, a one sixteenth inch offset may be used with an ink depth of less than one sixteenth inch.

When the tape, so marked, is loaded into cassettes the spaced cue marks define highly visible, spaced, concentric cue bands on the wound cassette reel as more specifically disclosed and illustrated in the aforesaid copending application.

In order to insure increased visibility on the wound cassette reel it is desirable that the marked interval be sufficiently long as to make several wraps around the small cassette reel. A marked interval of from 12–24 inches has been found to be satisfactory with approximately 15 inches being the preferred range of magnitude. Since the marking ink will be dry when the tape is unreeled from the marked pancake for cassette loading it is preferable that the offset wrap created on the wound tape supply reel extend not more than 360° about the circumference of the reel since if two adjacent wraps are marked the dry ink tends to adhere, preferentially, to one of the wraps and be stripped from the other when the tape is unwound. Accordingly, the hub of the reel on which the tape is marked should have a diameter of about 5 inches to insure that the initial tape wraps will have a circumferential extent of something more than 15 inches so that only a segment of one complete wrap need be offset and marked to insure marking of the desired length without the necessity for having to mark two immediately adjacent wrap edges.

The offset wraps are created by intermittently altering the tape path run between payout and take-up reels. In the case of prerecorded tapes, a solenoid is energized to move a tape guide, such as a roller or the like, positioned downstream of the duplicating head and upstream of the take-up reel to offset the tape path run which results in the creation of the offset wraps or wrap segments. In the case of tapes destined for use in nonrecorded cassette form, the tapes may be marked at equal, spaced intervals whereby home recordings may be commenced at a particular concentric cue band as it will appear on a wound cassette reel as more specifically disclosed in the aforesaid copending application.

DESCRIPTION OF THE DRAWINGS

FIG. 5 is a schematic illustration of the positioning of the take-up reel relative to an inking die just prior to marking of the offset wrap segment;

FIG. 6 is a fragmentary vertical cross section through the wound take-up reel and inking die illustrating marking contact between the inking die and offset wrap segments;

FIG. 7 is a plan view of a cassette which has been loaded from the marked take-up reel;

FIG. 8 is a plan schematic illustration of an alternate method of producing the offset wrap segments, at equal playing time intervals, on non-recorded tapes; and FIG. 9 is a cross-sectional view taken along line 9—9 of FIG. 8.

DESCRIPTION OF THE PREFERRED EMBODIMENTS

Figure 1:
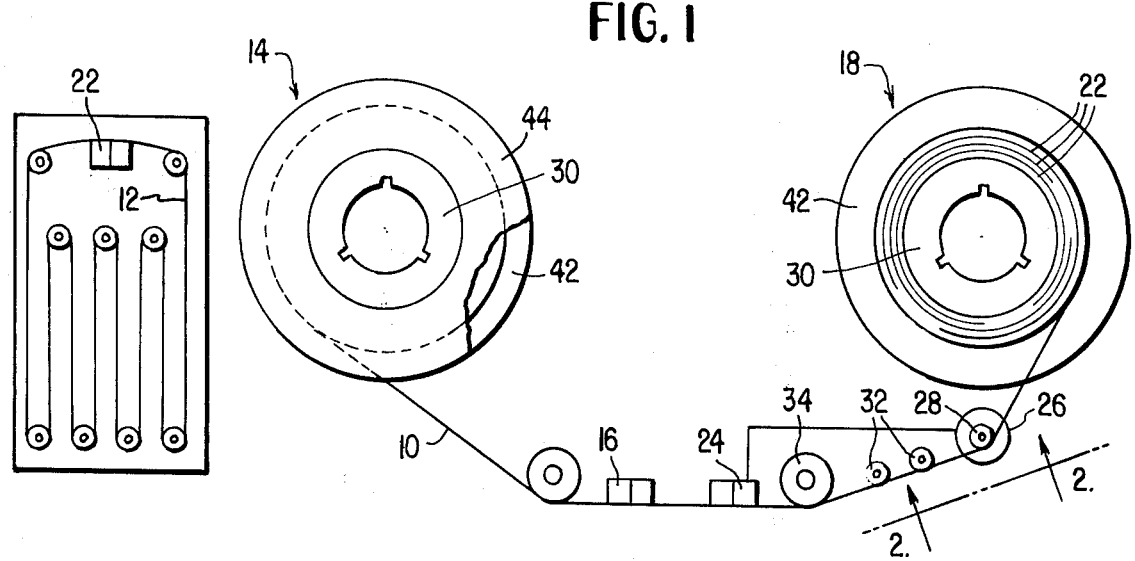
FIG. 1 is a plan schematic illustration of a system for recording magnetic tape and offsetting radially spaced tape wrap segments on a take-up reel preparatory to edge marking of the same.
Figure 2:
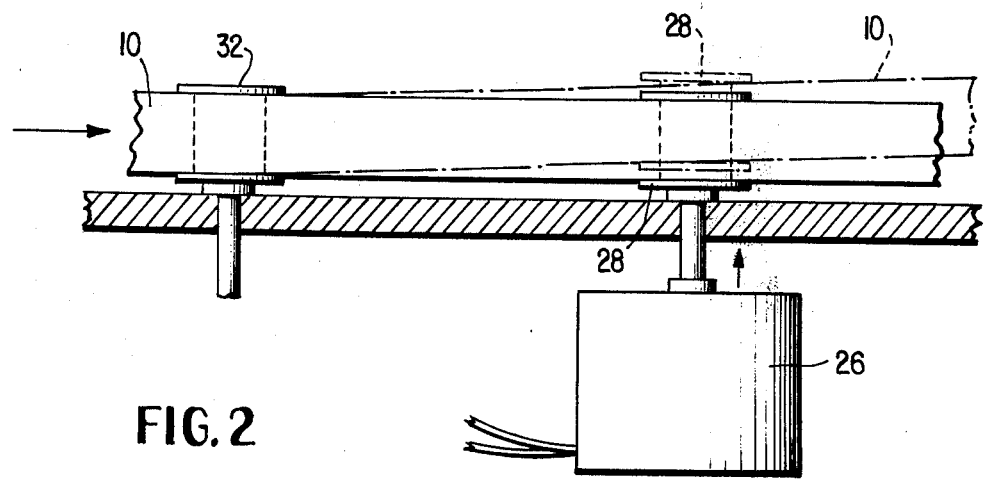
FIG. 2 is a cross section taken along line 2—2 of FIG. 1 illustrating the manner of intermittently diverting the tape path run.

In FIG. 1 is illustrated the duplication of one of a plurality of slave, magnetic tapes 10 from a master tape 12 as the slave tape is transported from pancake supply reel 14 across record head 16 and onto take-up reel 18. The multiple duplicate recordings of the entire contents of the master tape onto slave tape 10 is via master playback head 20 and slave record head 16 in conventional fashion. The usual 8 cycle tone cue signal that is normally recorded from the master to the slave tape to signal the end of that length of tape to be loaded into a cassette is, in accordance with the present invention, prerecorded at the audio pause interval between individual recorded selections. The presence of this 8 cycle tone cue signal is then relied on in the embodiment of FIG. 1 to control intermittent displacement of the running tape length to, in turn, produce offset wrap segments 22 on the take-up reel 18 which offset wrap segments comprise the usual audio pause intervals between recorded selections. Thus a conventional transducer 24 senses the presence of each prerecorded 8 cycle tone cue signal intermediate recorded selections to energize solenoid 26 and momentarily displace idle roller 28 to the phantom line position of FIG. 2 thereby momentarily displacing the running tape path length, parallel to the recording surface, and producing one of the offset wrap segments 22 on the take-up reel. The energization time of solenoid 26 to maintain idle roller 28 in the phantom line position of FIG. 2, prior to automatic return to the solid line position, is preset to equal the tape transport time, at duplicating speed, required for approximately 15 inches of tape to cross idle roller 28. In the case of a recording speed of 60 inches per second, for example, it will be apparent that the idle roller displacement to the phantom line position of FIG. 2 and return will occupy something less than 0.5 seconds. Since the conventional take-up reel hub 30 has a diameter of approximately 5 inches and a circumference exceeding 15 inches, each of the offset wrap segments 22, which are approximately 15 inches in length as produced on the wound take-up reel as a function of tape path displacement via roller 28, will extend less than 360° illustrated in FIGS. 1 and 3. The presence of fixed idle rollers 32 as well as the conventional guide roll 34 between record head 16 and displaceable idle roller 28 insures that displacement of the running tape length, at idle roller 28, is not transferred back to record head 16.

Figure 3:
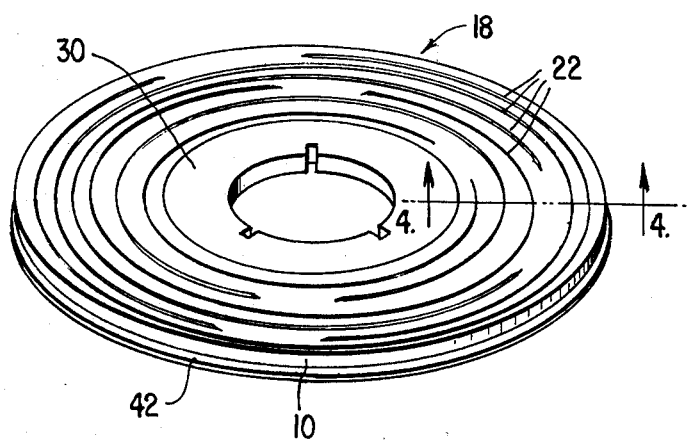
FIG. 3 is a top perspective view of the fully wound takeup reel of FIG. 1 illustrating the radially spaced, offset tape wrap segments.
Figure 4:
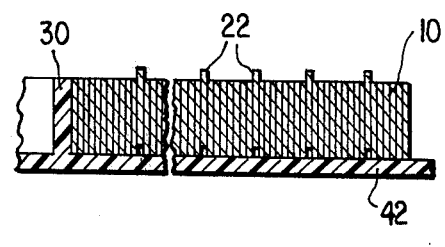
FIG. 4 is a greatly enlarged cross-sectional view taken along line 4—4 of FIG. 3.

When take-up reel 18 is fully wound with the offset wrap segments 22 projecting beyond the side edges of the remainder of the wraps as shown in FIGS. 3 and 4, the outer wrap is taped to maintain the tightly wound condition of the wraps and the reel is ready for marking. A marking die 36, which may consist of nothing more than a flat surface 38 such as glass or the like having a thin coating 40 of ink or other marking dye thereon is brought into marking engagement with the offset wrap segments 22. One manner in which this may be effected is illustrated in FIGS. 5 and 6. It will be appreciated that reel 18 is wound sufficiently tight that there is no tendency for the wraps to become displaced from the position shown in FIGS. 3 and 4 when the reel is inverted prior to bringing the same into marking contact with die 36 as in FIG. 5. This may be effected, manually, simply by inverting the reel and lowering it onto surface 38 where it is supported by the offset wrap segments 22 which extend through the coating 40 of marking ink and support the remainder of the wraps in spaced relation above the inking surface. Assuming, for example, an offset of each wrap segment of one sixteenth inch, the thickness of coating 40 would be substantially less such as on the order of one thirty second inch. Alternatively, a holding fixture could support reel 18, as by engagement with back reel flange 42 and/or hub 30 which fixture would be mounted for movement adjacent marking die 36 against a fixed stop to precisely define the approach of reel 18 to the marking die. In either event, the offset wrap segments are now marked and the marked reel 18 is set aside to dry.

It will be understood that in a dual track recording both tracks are simultaneously recorded, with their individual 8 cycle tone cue signals, at record head 16 and that the production of offset wrap segments 22 as just described correspond to the pause intervals between recorded selections on only one of the dual tracks.

In order to mark the other side edge of tape 10 to correspond with the recorded selections on the other of the dual track recordings, the now dry reel 18 is rewound on the original supply reel 14 simply by direct reel to reel transfer bypassing all of rollers 28, 32, 34, etc. to restore the now marked tape to its original wound pancake configuration, i.e. with no offset wrap segments. The rewound reel 14, which has both a lower flange like the flange 42 of reel 18, and an upper flange 44 is then inverted with the previously marked side facing down and the previously described operation is repeated to mark the other side edge of tape 10. In this letter operation the transducer 24 is, of course, sensing the 8 cycle tone on the second of the tracks whose audio pause intervals are to be marked.

The loading of a cassette 46 with the marked tape 10 results in the presence of highly visible cue bands 48, each comprising several marked wraps on the small cassette reels as illustrated in FIG. 7. It will be apparent that the actual number of offset wrap segments created and marked on supply reel 18 greatly exceeds the number shown in the drawing since an accurate depiction of the actual number would obscure the drawing. The actual number of markings that would appear on a 6,000 foot reel may comprise upwards of 100 marks on each side.

In the case of cassettes which are to be recorded by a home user the tape is simply marked at substantially equally spaced intervals, such as three minute play intervals for example, so that the home user may simply advance the cassette to a next succeeding cue band to commence the recording of a subsequent selection as more fully described in the aforesaid copending application. This permits the use of a much simpler control system to induce the running tape path deflection and may involve a conventional footage counter, a timer which may be readily set to deflect the tape path at equal, spaced distances since the transport speed is known or a simple gear reduction mechanism which renders the marking of accurate, substantially equally spaced intervals over that period of tape run that will comprise the length of tape to be loaded in a particular cassette insensitive to transport speed or, indeed, to variations in transport speed and it is this latter method that has been chosen for illustration in FIGS. 8 and 9.

In FIG. 8 is illustrated payout and take-up reels 50, 52 of the type described in connection with FIG. 1. An idle roller 54 is mounted for rotation and limited vertical movement on shaft 56 from the lower solid line position of FIG. 9, wherein blank tape 58 extends in a straight run between payout and take-up reels 50, 52, to a slightly displaced upper position as indicated in phantom lines. A small gear 60 is secured to take-up reel shaft 62 which gear 60 is in meshing engagement with a large gear 64 upon whose outer peripheral surface is mounted a small cam 66. Gear 64 is mounted on shaft 68 for rotation of cam 66 into upwardly caming engagement with idle roller 54 as will be apparent from FIG. 8.

In operation of the embodiment shown in FIGS. 8 and 9, powered rotation of take-up shaft 62 transports tape 58 and rotates gear 64 via take-up shaft gear 60. The running path length of tape 58 is displaced once each revolution of gear 64 as cam 66 comes into caming engagement with idler 54 to thereby create an offset wrap segment on take-up reel 52. The length of the wrap segment created is, of course, a function of the length of cam 66 as considered along the periphery of gear 64 while the equal interval tape length spacing between offset wrap segments is a function of the gearing ratio.

The upward displacement of idle roller 54 may, if desired, be produced by other mechanisms such as the previously mentioned footage counter or timer.

Alternatively, the idle roller 54 may be eliminated and the height of cam 66 calculated to produce the upward tape deflection, once each revolution, at a point intermediate the payout and take-up reels.

Irrespective of the manner in which the offset wrap segments are produced on the wound take-up reel of blank tape 58, the tape is then marked in precisely the same manner as described in connection with FIGS. 5 and 6.

I claim:

1. A method of edge marking a recordable tape, comprising; establishing a tape path run onto a take-up reel; winding said tape on said reel to produce a plurality of wound tape wraps thereon; steps for offsetting the side edges of at least segments of radially spaced ones of said wraps relative to the remainder of said wraps during the winding thereof; and marking the offset side edges to contrast the remainder of the wound reel.

2. The method of claim 1 wherein said steps include intermittently displacing said tape path run prior to winding said tape on said reel to produce said offset said edges.

3. The method of claim 2 including the step of sensing desired marking positions on said tape; and subsequently intermittently displacing said tape path run as a function of sensed marking positions.

4. The method of claim 2 including the step of intermittently displacing said tape path run as a function of tape movement onto said reel.

5. The method of claim 2 including the step of intermittently displacing said tape path run as a function of take-up reel rotation.

6. The method of claim 5 including the step of mechanically translating take-up reel rotation into the intermittent tape path displacement.

7. The method of claim 2 including the step of limiting the displacement time of said tape path to less the time of one reel revolution.

8. A method of edge marking a reelable web at spaced intervals there along, comprising; establishing a web path run onto a reel; winding said web onto said reel and intermittently displacing at least a portion of said web path run to produce a plurality of radially spaced web offsets on said reel having side edges projecting outwardly of the corresponding said edge of the remainder of said web; and marking said projecting side edges.

9. The method of claim 8 including the step of simultaneously contacting all of said projecting side edges with a marking fluid.

10. The method of claim 9 including the step of preparing a depth of the marking fluid on a flat surface which depth is less than the offset of said spaced web offsets.

11. A method of edge marking a recordable tape, comprising; establishing a tape path run onto a take-up reel; winding said tape on said reel to produce a plurality of wound tape wraps thereon; and steps for intermittently offsetting and marking the side edges of said tape to produce marked segments of radially spaced ones of said wraps.

12. A method of edge marking a recordable tape, comprising; establishing a normal tape path onto a take-up reel; winding said tape on said reel to produce a plurality of wound tape wraps thereon; steps for offsetting the side edges of said tape out of said normal tape path and for offsetting the side edges of at least segments of radially spaced ones of said wraps relative to the remainder of said wraps during the winding thereof; and marking the offset side edges to contrast the remainder of the wound reel.

13. A method of edge marking a recordable tape, comprising; establishing a tape path run onto a take-up reel; winding said tape on said reel to produce a plurality of wound tape wraps thereon; and steps for marking the side edges of said tape with a liquid material to contrast the remainder of said wound reel and for offsetting the side edges on reel relative to the remainder thereof.

14. A method of edge marking a recordable tape, comprising; establishing a normal tape path onto a take-up reel; winding said tape on said reel to produce a tape pancake having a plurality of wound tape wraps thereon; and steps for producing a plurality of offset edge marked tape wrap segments on the pancake including intermittently offsetting the tape out of the normal tape path and marking the side edges of said tape.

* * * * *